(12) United States Patent
Spearman et al.

(10) Patent No.: US 6,517,725 B2
(45) Date of Patent: Feb. 11, 2003

(54) OIL DEHYDRATOR

(75) Inventors: Michael R. Spearman, The Woodlands, TX (US); John H. Burban, Lake Elmo, MN (US); Mathews Thundyil, College Station, TX (US); Majid Zia, White Bear Township, MN (US)

(73) Assignee: Porous Media, St. Paul, MN (US)

( * ) Notice: Subject to any disclaimer, the term of this patent is extended or adjusted under 35 U.S.C. 154(b) by 0 days.

(21) Appl. No.: 09/935,098

(22) Filed: Aug. 22, 2001

(65) Prior Publication Data

US 2002/0100726 A1 Aug. 1, 2002

Related U.S. Application Data

(63) Continuation-in-part of application No. 09/552,369, filed on Apr. 19, 2000, now abandoned, which is a continuation-in-part of application No. 09/320,887, filed on May 27, 1999, now abandoned.

(51) Int. Cl.$^7$ ............................................... B01D 61/00
(52) U.S. Cl. ............................ 210/640; 210/644; 95/45
(58) Field of Search ............................ 210/640, 321.8, 210/644, 500.23; 95/45–52, 54; 96/6

(56) References Cited

U.S. PATENT DOCUMENTS

| | | |
|---|---|---|
| 4,493,772 A | 1/1985 | Tanaka |
| 4,615,811 A | 10/1986 | Watkins |
| 4,655,938 A | 4/1987 | Fragola |
| 4,780,203 A | 10/1988 | Barcy |
| 4,780,211 A | 10/1988 | Lien |
| 4,790,941 A | 12/1988 | Taylor |
| 4,844,804 A | 7/1989 | Taylor |
| 4,846,977 A | 7/1989 | DeVellis et al. |
| 4,850,498 A | 7/1989 | Taylor |
| 4,857,081 A | 8/1989 | Taylor |
| 4,877,533 A | 10/1989 | Meldrum et al. |
| 4,886,603 A | 12/1989 | Taylor |
| 4,892,667 A | 1/1990 | Parker, III et al. |
| 4,931,181 A | 6/1990 | Blume et al. |
| 5,051,114 A * | 9/1991 | Nemser et al. |
| 5,069,799 A | 12/1991 | Brownawell et al. |
| 5,076,932 A | 12/1991 | Taylor |
| 5,126,503 A | 6/1992 | Bartels |
| 5,158,681 A | 10/1992 | Freeman et al. |
| 5,182,022 A | 1/1993 | Pasternak et al. |
| 5,203,969 A | 4/1993 | Wenzlaff et al. |
| 5,211,856 A | 5/1993 | Shen |

(List continued on next page.)

OTHER PUBLICATIONS

K. Scott; Handbook of Industrial Membranes, 1st Edition; Elsevier Advanced Technology, Oxford, U.K.; 1995.

Kaydon Custom Filtration; Unique Process Technology Turbo–Toc Turbine Oil Conditioner; LaGrange, GA, May 1993.

Pall Industrial Hydraulics Company; East Hills, NY; HSP 180 Series Portable Oil Purifier; 1993.

Pall Industrial Hydraulics Company; East Hills, NY; HVP Series Portable Oil Purifier; 1994.

Ho & Sirkar; Membrane Handbook; Van Nosterand Reinhold, NY; Overvew; 1992.

Primary Examiner—Ana Fortuna
(74) Attorney, Agent, or Firm—Marshall & Melhorn, LLC

(57) ABSTRACT

A method and apparatus for the removal of free, emulsified, or dissolved water from liquids of low volatility, such as oil, is shown. The liquid of low volatility is removed by contacting the fluid stream of concern with one side of a semi-permeable membrane. The membrane divides a separation chamber into a feed side into which the stream of fluid is fed, and a permeate side from which the water is removed. The permeate side of the chamber is maintained at a low partial pressure of water through presence of vacuum, or by use of a sweep gas.

65 Claims, 6 Drawing Sheets

U.S. PATENT DOCUMENTS

| | | |
|---|---|---|
| 5,277,827 A | 1/1994 | Osborne |
| 5,443,724 A | 8/1995 | Williamson et al. |
| 5,464,540 A | 11/1995 | Friesen et al. |
| 5,552,023 A | 9/1996 | Zhou |
| 5,552,054 A | 9/1996 | Koops et al. |
| 5,702,503 A * | 12/1997 | Tse Tang |
| 5,749,942 A * | 5/1998 | Mattis et al. |
| 5,888,275 A * | 3/1999 | Hamasaki et al. |
| 6,001,257 A | 12/1999 | Bratton et al. |
| 6,075,073 A * | 1/2000 | McGlothin et al. |
| 6,299,777 B1 * | 10/2001 | Bowser |

* cited by examiner

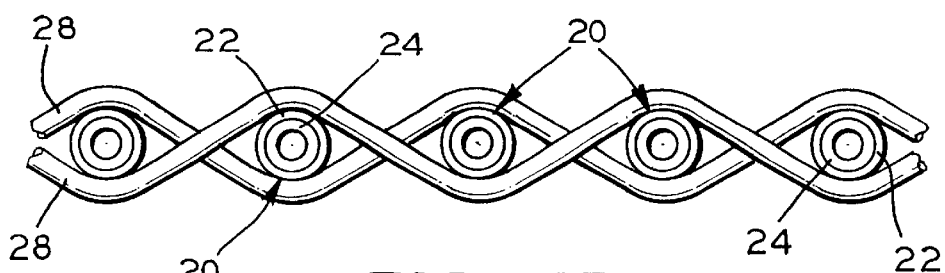
FIG. 4B
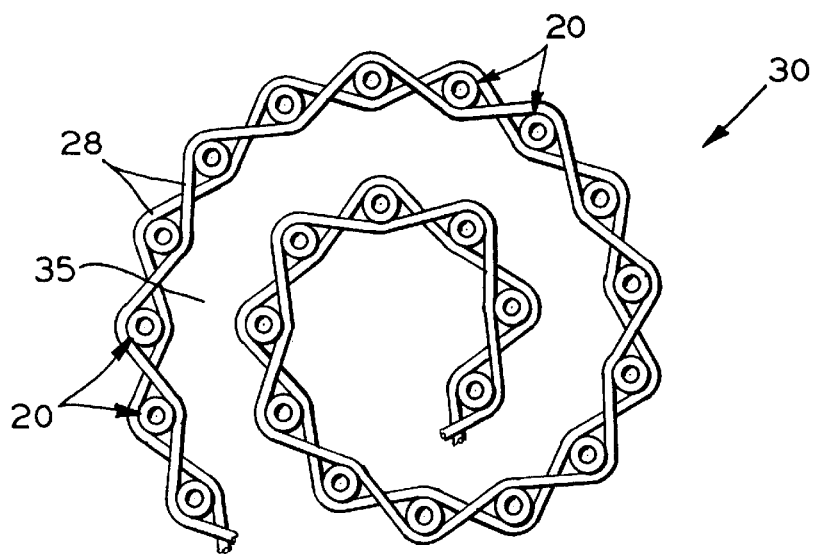
FIG. 4C
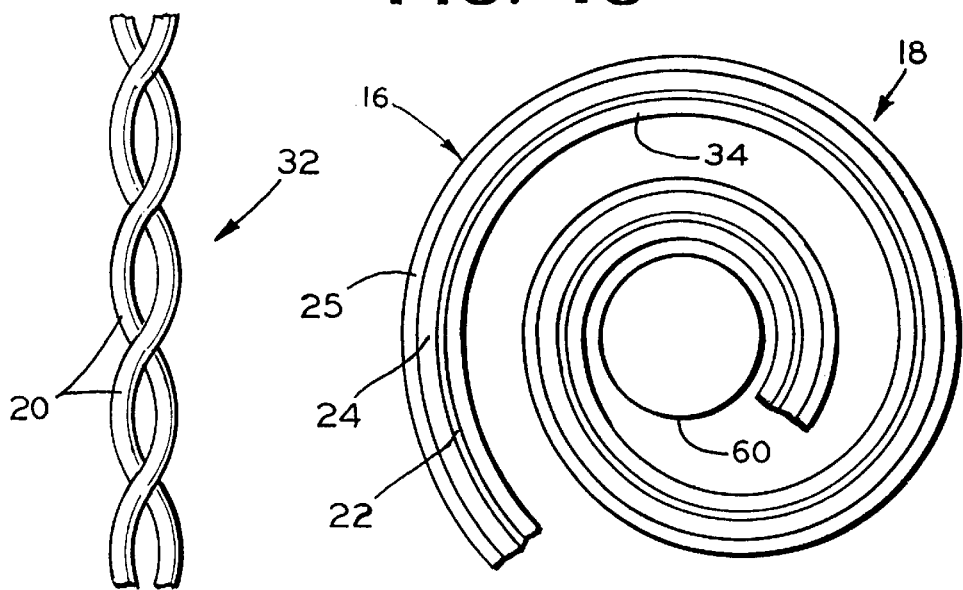
FIG. 4D    FIG. 5

OIL DEHYDRATOR

CROSS-REFERENCE TO RELATED APPLICATIONS

This application is a continuation-in-part application of U.S. application Ser. No. 09/552,369, filed on Apr. 19, 2000, abandoned, which was a continuation-in-part application of U.S. application Ser. No. 09/320,887, abandoned, filed on May 27, 1999. U.S. Ser. No. 09/552,369 was pending as of the filing date of the present application, and U.S. Ser. No. 09/320,887 was pending as of the filing date of U.S. Ser. No. 09/552,369.

BACKGROUND OF THE INVENTION

1. Field of the Invention

The present invention relates generally to the lubrication and hydraulic industry, and particularly to an apparatus and a process used for the removal of free, emulsified, or dissolved water from oil, and more generally, from liquids of low volatility.

2. Discussion of the Related Art

Oil is used in lubrication and hydraulic systems. It is widely recognized that the presence of water has deleterious effects on the oil in such systems, the components in the systems, and the operation of the systems. It is well known that corrosion; oil oxidation, chemical wear and tear, reduced bearing fatigue life, and loss of lubricity may result when water contamination enters a lubrication or hydraulic system. These deleterious effects can be directly attributed to water present in free, emulsified or dissolved form.

Consequently, significant efforts have been made to remove water from oil in order to provide optimal performance of lubrication and hydraulic systems. The devices and systems that have been used to remove water contamination include settling tanks or reservoirs, centrifuges, water absorbing filters, and vacuum dehydration oil purifiers. However, these have had significant limitations in either their water removal capabilities, ease of operation, capital costs, or operating costs, as will be discussed.

Settling tanks remove bulk quantities of "free" water from oil based on the difference in their densities and gravitational settling. To be effective in removing "free" water, settling tanks require large residence times and a significant amount of floor space. However, they are ineffective in separating oil-water emulsions and are not capable of removing dissolved water.

Centrifuges accelerate the gravitational settling of water from oil by imposing centrifugal force on the fluid that, in effect, elevates the gravitational force. Centrifuges are effective in removing free water from the oil. However, these centrifuges are generally expensive, and have limited capability of separating oil-water emulsions. They cannot remove dissolved water from the oil.

Water absorbing filters use special filter media that absorbs water from the oil. As the water is absorbed, the media swells, the flow is restricted, and the pressure drop across the filter rises. When the pressure drop reaches a predetermined level, the water absorbing filter is removed, disposed of, and a new filter is installed. These water-absorbing filters are effective in removing free water but have marginal effect in removing emulsified or dissolved water from the oil. In addition, water-absorbing filters have a limited capacity for water. Therefore, they must be replaced once they are saturated with water. Consequently, they are typically only used in applications where trace amounts of water are present. In applications where water concentrations are higher, the cost of continuously replacing water-absorbing filters becomes very high. Several types of vacuum dehydration oil purifiers have been used for oil dehydration. These generally operate under the principle of vacuum distillation, mass transfer of moisture from the oil to dry air, or a combination of the two.

In vacuum distillation, a vacuum is applied to reduce the boiling point of the water. For example, while the boiling point of water is 100° C. (212° F.) at 1013 mm $H_2O$ (29.92" Hg) barometric pressure (standard atmospheric pressure), its boiling point at 100 mm $H_2O$ (approximately 26" Hg of vacuum) is only 50° C. (122° F.). By applying a sufficient vacuum relative to the temperature of the oil, the water in the oil will evaporate from the oil into the low-pressure air (vacuum), thus dehydrating the oil.

Flowing the oil into a contactor vessel which has a vacuum applied to it by means of a vacuum pump is the typical means by which this is achieved. In order to maximize the water vaporization rate in a given vessel, large surface area-to-volume ratios of oil are preferred. This can be accomplished by means of flowing the oil over structured packing, random packing, cascading plates, spinning discs, or other methods well known in the vacuum distillation and contactor fields. The oil usually enters at the top of the contactor and flows gravitationally downward over the packing, spreading into relatively thin films. The oil collects in the bottom of the vessel where it must be pumped out by means of an oil pump. Examples of these are U.S. Pat. No. 4,604,109 by Koslow and U.S. Pat. No. 5,133,880 by Lundquist, et al. Heat may be added to the oil in order to reduce the amount of vacuum needed.

Vacuum is applied to lower the water boiling point, and to increase the water removal rate. Heat may also be applied to increase the water removal rate. However, great care must be taken in not applying too much heat and/or vacuum because more and more of the lower molecular weight hydrocarbons in the oil will also be vaporized as the temperature and/or vacuum is increased to levels below their boiling points. It should be understood that any liquid with a boiling point less than water will also be removed. This may, or may not be desirable, depending upon the application.

Mass transfer-based systems use similar contactor vessels. However, rather than relying on distillation for removal of the water, dry air or gas is continuously passed counter-currently upwards across the oil that flows downward. Water molecules in the oil will move via a concentration gradient into the relatively drier air. The now humid air is drawn from the contactor by a vacuum pump or blower and exhausted to atmosphere. It is not necessary to heat the oil more than the boiling point of water in order for the water to vaporize. Therefore, less heat and/or vacuum can be used for water removal with a mass transfer-based system than in vacuum distillation systems.

While vacuum distillation and mass transfer systems do remove free, emulsified and dissolved water, they have several drawbacks that have prevented their widespread use. In both systems, liquid level controls are used within the vessel in order to ensure that the oil level does not become so low so that the oil pump runs dry. The liquid level controls also function to ensure that the oil level does not become so high that the vacuum vessel fills with oil. This would reduce or eliminate the water removal efficiency of the vessel and may even lead to the oil entirely filling the vessel and overflowing into the vacuum pump.

Vacuum purifiers are also subject to foaming within the vessels as water is vaporized within the oil. This foam has a lower specific gravity than the oil and can cause malfunctioning of the liquid level controls and a reduction in the performance of the purifier.

Due to the very nature of the use of heaters, controls, pumps, etc., purifiers are relatively complex pieces of equipment. In addition, the type of packing used, the viscosity of the oil, and the airflow rate, limit the flow rates through contactor vessels. This usually results in very large vessels being used relative to the amount of flow. When packaged with all of the necessary oil pumps, vacuum pumps, heaters, controls, electrical panels and connections, the system becomes quite large and expensive. With the number of components and complexity of these systems, the maintenance and operating costs are usually quite high as well.

Due to their ability to remove free, emulsified or dissolved water from oil, vacuum dehydration oil purifiers have become the desired method for water removal from oil. However, the drawbacks associated with vacuum oil purifiers have prohibited these purifiers from being widely used and/or are not practical on the majority of lubrication or hydraulic systems. Because of their relatively large size and costs, they are limited to non-mobile, stationary applications, and are not practical for, use on mobile equipment.

Due to their high capital cost, they are typically not permanently installed in a system unless it is a relatively large, expensive lubrication or hydraulic system. Instead, they are usually shared by several systems by using one to purify the oil on one machine or reservoir for a period of time, and then move it to another machine, etc. However, when the purifier is being used in this manner, the oil in the machines that are not connected to the purifier can become contaminated with water. This oil will remain contaminated until the purifier can be reattached to them and the oil dehydrated again. Thus, those skilled in the art have continued to search for better ways to remove oil from water. Applicants have directed their efforts toward membrane based systems.

Membrane based systems have been used to remove water from organic systems. It must, however, be recognized that the presence of pores or defects in a membrane used for this purpose will result in the hydraulic permeation of the oil to the permeate side. This situation will result in the loss of oil. It will also allow the non-volatile oil to coat the permeate side of the membrane, thereby fouling the membrane and reducing its effectiveness in permeating water.

U.S. Pat. No. 4,857,081 to Taylor discloses a process for the dehydration of hydrocarbons or halogenated hydrocarbon gases or liquids. This process is based on a cuproammonium regenerated cellulose membrane. Cuproammonium regenerated cellulose membranes are known to those skilled in the art to have a structure of mutually connected passages or pores (U.S. Pat. No. 3,888,771 to Isuge et al). These membranes are also said to have a distribution of pores of the order of 10–90 Å, with a mean of 30 Å (U.S. Pat. No. 3,888,771 to Isuge et al, U.S. Pat. No. 5,192,440 to Sengbusch). The mechanism for separation of water from the liquid organic phase through this cuproammonium regenerated cellulose is that of dialysis. The permeating species permeates the membrane as a liquid. Since the membrane has pores, it permits hydraulic permeation through it. Water-soluble species may permeate through it as well. This precludes its utility in the dehydration of oil, as the oil will always have a finite solubility in water.

Even if Taylor were satisfactory for dehydration of oil, the structure of Taylor will itself cause defects. The molecular structure of the regenerated cellulose membranes is maintained by the presence of moisture. Upon removal of the moisture from the hydrophilic membrane, the pores undergo large capillary stresses which can lead to shrinkage and cracking of the membrane. Since the membranes have pores of various sizes the capillary stresses formed during drying result in differential stresses throughout the membrane microstructure. This differential stress is known to cause cracks or "defects" in the membrane. If such a membrane is used to dehydrate a closed system, the moisture in the membrane will be eventually stripped out. This results in the creation of cracks or "defects" as described above. These "defects" will now cause the hydraulic transport of oil through the membrane.

U.S. Pat. No. 5,182,022 to Pasternak et al discloses a pervaporation process for the dehydration of ethylene glycol. The ethylene glycol is completely miscible with water, and is characteristic of pervaporation applications where the mixtures to be separated are fully miscible. The sulfonated polyethylene resin membrane that is used permits substantial quantities of ethylene glycol to permeate. It will be apparent to those skilled in the art that the permeation of such quantities of ethylene glycol is due to hydraulic permeation through.defects (see definition below), which are present in the discriminating layer. The invention does not require a defect-free discriminating layer because the loss of the non-aqueous phase is tolerable. This is not the case in the dehydration of oil in a lubrication and hydraulic system.

U.S. Pat. No. 5,464,540 to Friesen discloses a process for the removal of a component from a liquid feed mixture via the process of pervaporation. The sweep stream in the Friesen et al patent is comprised of a component of the feed stream that is not to be removed and is introduced to the module as a vapor. In column 5, lines 8 to 13, Friesen et al postulates that the process can be used to dehydrate oils such as sesame oil and corn oil. However, in the examples provided in the patent, Friesen et al only provides performance data for the dehydration of organic compounds of high volatility, much in excess of sesame oil and corn oil. In particular, Friesen provides examples for the dehydration of acetone, toluene, and ethanol. Consequently, it is clear that Friesen fails to recognize and teach the need for a defect free (as described hereinbelow) non-porous membrane for the dehydration of these types of oils. Those skilled in the art may also question the feasibility of providing a sweep stream of corn oil or sesame oil vapor.

U.S. Pat. No. 5,552,023 to Zhou discloses a membrane distillation technique for the dehydration of ethylene glycol. This process employs a porous membrane. This is unattractive for the dehydration of oils because of the likelihood that the porous support will get wetted out and hydraulically permeate the fluids.

U.S. Pat. No. 6,001,257 to Bratton et al discloses a zeolite membrane that is substantially defect-free for the purpose of dehydration of various liquids. As noted in column 4, lines 12–15 of Bratton, the use of the zeolite membrane is critical to the function of the apparatus, as it can be used to separate any two liquids where only one liquid can pass through the zeolite membrane. Zeolite membranes use zeolitic-type materials, which are also known as molecular sieves, and contain a network of channels formed from silicon/oxygen tetrahedrons joined through the oxygen atoms. Column 2, lines 46–49, indicate that the material should be "substantially free of defects", without defining the extent of "substantially" or the implied meaning of "defect". Such a membrane cannot be used for the dehydration of oils because the presence of defects, described hereinbelow, will result in the hydraulic permeation of oil to the permeate side.

In the context of the present invention, the following terms, as used throughout the application, are intended to convey the meanings defined hereinbelow:

Definitions

"Defect", as used herein, is used to indicate an aperture through the membrane of sufficient size to allow hydraulic permeation of the liquid of low volatility through the membrane.

"Defect free", therefore, indicates a membrane containing no apertures of sufficient magnitude to allow hydraulic permeation of liquids through the membrane, instead limiting the passage of materials through the membrane to solution diffusion. Hydraulic permeation of oil will tend to occur when permanent apertures (i.e. pinholes) of a diameter greater than or equal to the molecular size of oil are present in a membrane. It is expected that the molecular size of the oil molecules is greater than 5 to 10 Angstroms, however since oil consists of fractions of different molecular size, the exact value will depend on the chemical makeup of the particular oil being dehydrated. Thus defect free membranes are limited to apertures of a smaller diameter than the molecular size of the oil molecules.

"Non-porous" indicates membranes that do not contain what are commonly referred to as pores, that is permanent apertures of at least the molecular size of the oil molecules, which as discussed above is expected to be greater than 5 to 10 Angstroms, but absolutely dependent on the particular type of oil being dehydrated.

While a defect free membrane, as used herein, is inevitably non-porous, a non-porous membrane, as used herein, is not necessarily defect free. In theory, a non-porous membrane would be one that is defect free, i.e. free from defects as described above. This implies that, a defect free membrane would have the same gas permeability/selectivity as a dense film made from the same material. In practice, however, this is not the case. For example, Pinnau and Koros (Pinnau, I. And Koros, W., "Gas-Permeation Properties of Asymmetric Polycarbonate, Polyestercarbonate, and Fluorinated Polyimide Membranes Prepared by the Generalized Dry-Wet Phase Inversion Process," J. Applied Polymer Science Vol. 46 1195–1204 (1992)) and Pesek (Pesek, S. "Aqueous Quenched Asymmetric Polysulfone Flat Sheet and Hollow Fiber Membranes Prepared by Dry/Wet Phase Separation" Dissertation submitted to The University of Texas at Austin (1993)) have defined a defect-free gas separation membrane as a membrane that has 75% to 85% of the perselectivity of a dense film. It can be shown that, a membrane that has 85% of the permselectivity can contain a significant number of defects that would allow for the hydraulic permeation of oil.

Consider a membrane consisting of a polysulfone selective layer supported by a substructure of negligible resistance. At 35° C., polysulfone has an oxygen permeability of 1.4 barrer (Membrane Handbook) and an $O_2/N_2$ selectivity of 5.6. Consider the thickness of the polysulfone selective layer to be 700 Å. This thickness is typical for commercially available membranes. Accordingly, the permeance of this selective layer for oxygen would be 20 GPU and for nitrogen 3.57 GPU. According to Pinnau and Koros (1992) this polysulfone membrane would be considered defect free if the $O_2/N_2$ selectivity was 85% of the dense film, or in this case 4.76. Obviously according to the definition of the present invention, this membrane contains defects. If the defects are small enough, the flow through the defects will be governed by Knudsen diffusion. If the defects are large, then flow through the defects will be convective (or viscous) and will obey the Hagen-Poiseuille law. The table below illustrates the number of defects of different size that would result in a $O_2/N_2$ selectivity of 4.76 for a 1 square meter polysulfone module.

| Knudsen Diffusion Through Defects in Selective Layer | | | |
|---|---|---|---|
| Defect Diameter (Å) | 25 | 50 | 100 |
| Number of Defects | 1.22E + 11 | 1.53E + 10 | 1.91E + 9 |
| Surface Porosity (Defect Area/Total Area) | 6.0E − 7 | 3.0E − 7 | 1.5E − 7 |
| Convective Flow Through Defects in Selective Layer, 1 psig Applied Pressure | | | |
| Defect Diameter (·m) | 0.5 | 1 | 2 |
| Number of Defects | 39700 | 247 | 15 |
| Surface Porosity (Defect Area/Total Area) | 7.8E − 10 | 1.9E − 10 | 4.9E − 11 |

The average size of the defects listed in the above table are large enough to allow hydraulic permeation of oil through the defects and render a oil dehydration module commercially unviable. However, for an application such as gas separation, the presence of the defects merely reduces the efficiency of the separation but does not render the module commercially unviable.

In theory, a non-porous membrane would be one that is defect free, i.e. free from defects as described above. In practice, however, this is not the case. As practiced, and as recognized by one skilled in the art, a membrane that is regarded as being non-porous will allow hydraulic permeation up to a certain factor, typically sufficient to reduce its gas selectivity by up to 85% from the intrinsic selectivity of the dense film, and will still be considered a non-porous membrane. Thus, such a membrane would actually have a relatively small but still significant number of pores. The actual number of pores that would be acceptable in a "non-porous" membrane would be related to the size of the pores and the properties of the materials being separated by the membranes. As used herein, the defect free membranes refer to non-porous membranes that are non-porous as defined hereinabove, and not non-porous as the term is generally used in the art. For the successful practice of the present invention, the membrane must be "non-porous" and "defect-free" as the terms are defined herein.

"Oil" is used to indicate a low volatility chemical material. Typically, the oil will comprise many fractions of different molecular weight and molecular structure in a mixture.

"Semi-permeable" indicates a membrane that allows permeation of certain materials while being resistant to the transport of other materials. Such a membrane can also be referred to as a discerning membrane.

"Wetting" indicates the spreading of a liquid over a surface.

"Fouling" indicates adding a resistance to mass transfer through an undesirable action such as filling the porous substructure of the membrane with oil, or coating the sweep side of the membrane with oil.

SUMMARY OF THE INVENTION

The present invention provides a membrane based process for removing free, emulsified or dissolved water from oils or other liquids of low volatility. This process is such that it may be used on mobile equipment while in operation and moving, as well as on stationary equipment and processes. The operation of this process is simple, while the equipment in question is small and compact making it practical and cost effective for systems of all sizes.

The present invention further provides for a defect-free discriminating layer, or membrane, which does not permit the hydraulic permeation of liquids through it, restricting permeation to transport through the discriminating layer. The invention further provides for the removal of the vapors permeating through the discriminating layer. Thus, the present invention provides an apparatus and method for more efficiently separating free, emulsified and dissolved water from oil.

Specifically, this invention relates to the process of using a non-porous, defect free membrane to remove water selectively from oils. More particularly, the process consists of removing water from the oil stream of concern by contacting the oil with one side ("feed side") of a semi-permeable membrane. The membrane divides a separation chamber into the feed side into which the oil is fed, and a permeate side from which the water is removed. The permeate side is maintained at a low partial pressure of water through presence of vacuum, or by use of a sweep gas. The water in the oil may be either in the dissolved form, or, as a separate phase, either emulsified, dispersed or "free." The membrane material is one that is of the appropriate chemical compatibility with the oil, while selectively permitting the transport of water across it. The membrane is chemically compatible with the oil if it does not chemically react with the oil, or if its physical properties such as size, strength, permeability, and selectivity are not adversely affected by contact with the oil.

Thus, one of the objects of the present invention is to overcome the shortcomings of conventional oil dehydration techniques, and provide a new apparatus and a process for dehydrating oil that overcomes these limitations.

Another object of this invention is to provide an oil dehydrator that removes free, emulsified or dissolved water from oils.

A further object of the present invention is to provide an oil dehydrator that is simple to operate.

A further object of the present invention is to provide an oil dehydrator that is relatively small and compact.

A further object of the present invention is to provide an oil dehydrator that is cost effective.

A further object of the present invention is to provide an oil dehydrator that is practical to use on small and large systems.

A further object of the present invention is to provide an oil dehydrator that may be used on mobile equipment while in operation and moving.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 4B is a cross sectional view, taken in the direction of the arrows, along the section line B—B of FIG. 4A.

FIG. 4C is a schematic diagram of the mat shown in FIG. 4B after being spirally wound.

FIG. 4D is a perspective view of two hollow fiber semi-permeable membrane constructions, such as illustrated in FIG. 3, after being helically wound.

FIG. 5 is a schematic view of the construction shown in FIG. 1 after being spirally wound.

DETAILED DESCRIPTION OF THE INVENTION

Figure 1:
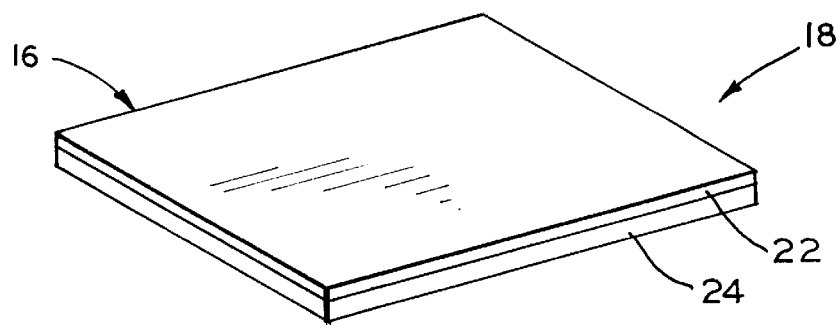
FIG. 1 is a perspective view of a membrane construction used in the present invention.

It is to be understood that the specific devices and processes illustrated in the attached drawings, and described in the following description, are exemplary embodiments of the inventive concepts defined in the appended claims. Hence, specific dimensions and other physical characteristics relating to the embodiments disclosed herein should not be considered as limiting, unless the claims expressly state otherwise.

Before describing the preferred embodiment of the invention, incorporated herein as if fully rewritten are the *Membrane Handbook*, pages 3–15, published by Van Nostrand Reinhold, 1992 and the *Handbook of Industrial Membranes First Edition*, pages 56–61, 1995.

According to the present invention, there is an apparatus and a process with utility in the discriminating removal of water, or other highly volatile solvents, from a broad class of liquids of low volatility. A liquid of low volatility is defined as a liquid with a normal boiling point greater than that of water (100° C.). Water may thus be categorized as a liquid of high volatility. It is necessary to recognize that components that may exhibit low volatility in the pure state may behave non-ideally in a mixture. This can result in a greater apparent rate of evaporation of a component from a mixture than would be expected from pure component volatilities. Preferably, the present invention is involved in the separation of water from oil.

More specifically, the process of dehydrating the oil consists of the following steps: contacting one side of a non-porous, defect-free, semi-permeable membrane with a liquid stream containing at least oil and water, wherein the membrane divides a separation chamber into a feed-side, into which the feed liquid mixture is fed, and a permeate side, from which the water is withdrawn; maintaining a partial chemical potential gradient for water such that the water preferentially permeates through the membrane from the feed side to the permeate side; removing, from the permeate side, the water that has permeated; and removing, from the feed side of the membrane the oil that is dehydrated. The term "chemical potential gradient" may also be referred to as an "activity gradient" or as a "partial pressure gradient." The term "partial pressure gradient" is understood to mean the difference between the water vapor pressure on the permeate side and the equilibrium water vapor pressure corresponding to the water concentration in the oil.

The device for dehydrating the oil consists of a vessel containing at least a nonporous, semi-permeable, defect-free membrane interposed in said vessel in such a fashion as to divide the interior of the vessel into at least one feed-side space and one permeate space; at least one inlet opening to the feed space; at least one outlet opening to the feed space; and at least one outlet opening to the permeate space. Such an apparatus would enable flowing the oil-water mixture in through the inlet opening, and contacting at least one side of the semi-permeable membrane; maintaining a chemical potential gradient for water such that the water preferentially permeates through the membrane from the feed side to the permeate side; removing, from the permeate side, the water that has permeated through the outlet opening; and removing from the feed side of the membrane, the oil that is dehydrated, through the outlet opening.

The membrane can be in many form or shape as long as a surface suitable for separation is provided. Common examples of this include self-supported films, hollow fibers, composite sheets, and composite hollow fibers. The hollow fiber membranes may be potted or otherwise disposed so that the fibers are nominally parallel to each other. The fibers of the composite hollow fiber membrane or the hollow fiber membrane may be helically wound or twisted. Alternatively, the fibers may also be woven into a mat. In the case of a membrane that is composed of flat sheets or mats of fibers, the sheets or mats may be spirally wound. In addition, spacers may separate the sheets or mats.

The membrane used is made, at least in part, of a thin, defect-free, dense, nonporous, discriminating layer (the term "discriminating layer" may also be referred to as "skin") and a support structure. In an alternate embodiment, the discriminating layer may be self-supporting; however, this is not required to practice the invention. To those skilled in the art, it is clear that dense, nonporous, discriminating layers may have defects in the discriminating layer. When such a discriminating layer is used for separating a mixture of gases, or of liquids, non-discriminating transport may occur through these defects. In the case of such a discriminating layer used to separate a gas mixture, the transport through the discriminating layer occurs by "solution-diffusion", whereas transport through the defects occur by Knudsen diffusion. This has been documented by Clausi Clausi, N. "Formation and Characterization of Asymmetric Polyimide Hollow Fiber Membranes for Gas Separation" Dissertation submitted to The University of Texas at Austin (1998). When such a defect-containing discriminating layer is used to separate a mixture of liquids, non-discriminating hydraulic transport will occur through these defects. The hydraulic permeation through these defects will result in liquid permeation to the permeate side of the membrane.

While such non-discriminating transport is acceptable in some applications, it is not acceptable in other uses.

An example of a defect-free, dense, nonporous discriminating layer is that of a solution cast dense membrane. These membranes are very well known in to those skilled in the art. A defect-free, dense, nonporous discriminating layer with a dehydration rate that is commercially viable, may be made by solution casting such films with a sufficiently thin thickness as to permit the desired dehydration rate. Potential defects may be eliminated by multiple coats of the solution cast polymer, with intermediate cross-linking steps.

In the specific instance of oil dehydration, the hydraulic permeation of oil to the permeate side will result in the loss of oil from the system, rendering the dehydrator commercially non-viable, and will result in the fouling of the permeate side of the membrane. If the ,discriminating layer is supported on the permeate side, the hydraulically permeated oil will fill the porous support and foul the membrane by offering a resistance to the transport of water. Further, since the oil is unlikely to evaporate, or if evaporation does occur, it will not evaporate faster than the rate of hydraulic permeation through the defects, the presence of defects will irreversibly foul the membrane and reduce the rate of dehydration. Further, if the membrane is not completely defect-free, the sweep that may be used on the permeate side to sweep away the moisture may pass through the membrane and thus be entrained in the "clean" oil. This may create foam in the oil, and is thus undesirable.

The mechanism of transport through such a the defect-free, dense, nonporous discriminating layer is through "solution-diffusion." To those skilled in the art, the term "solution-diffusion" is understood to mean the dissolution of the permeating species into the discriminating layer, followed by diffusion through the discriminating layer, followed by de-sorption on the permeate face of the discriminating layer. The oil and water exist in the liquid phase on the feed side of the membrane, whereas, the permeated species are removed from the permeate face of the discriminating layer in the vapor, or gas phase. If the discriminating layer contains any defects, hydraulic permeation will occur through the discriminating layer resulting in the transport of liquids to the permeate side. As described above, this situation will foul the membrane and result in the loss of oil from the system, both leading to a commercially non-viable product.

Pervaporation, to those skilled in the art, is understood to mean the separation of a mixture of liquids that are completely miscible through a dense, nonporous discriminating layer. Further, pervaporation is understood to mean that the components permeate through the discriminating layer at a finite rate and are removed on the permeate side as a vapor. Further, in the case of pervaporative dehydration, in the event of a defective discriminating layer, the hydraulic transport of the non-aqueous phase to the permeate side is not catastrophic. This is because the non-aqueous phase has a high vapor pressure and is easily evaporated. This is the case even for low volatility components such as ethylene glycol which when mixed with water can exhibit significant non-expected behavior compared to the pure component.

Porous membranes such as those used for micro-filtration, ultra-filtration, and dialysis are not suitable, as the low volatility fluid will permeate the pores, and foul the membrane.

Included as suitable membranes are dense, nonporous polymer films or asymmetric membranes with relatively dense discriminating layers, or skins, on one, or both, surfaces of a support structure. Dense, nonporous membranes are made either by "phase inversion," or by "solution casting."

In the case of phase inversion, a polymer-solvent-nonsolvent system is forced to precipitate by evaporating the solvent, extracting the solvent, or introducing nonsolvent into the system. Phase inversion results in a non-homogeneous, porous polymer matrix which may or may not be symmetric, and which may or may not have a region of dense, nonporous polymer. A dense, nonporous discriminating layer may be formed by phase separation by the appropriate choice of solvent-nonsolvent systems and precipitation systems.

In the case of solution casting, a suitable polymer-solvent system is permitted to gel and then dry. Solution cast polymers are typically not porous and are homogenous films.

In both cases, the dense, nonporous film may be formed on another support structure. The dense, nonporous discriminating layer formed by both methods is likely to have defects (U.S. Pat. No. 4,230,463). Methods to post treat these discriminating layers to reduce defects substantially have also been reported by Henis and Tripodi (Henis, J. and Tripodi, M., "Composite Hollow Fiber Membranes for Gas Separation: The Resistance Model Approach," J. Membr. Sci. (8) 233–245 (1981)). These methods to reduce these defects involve repeatedly coating the defective membrane until all the defects are eliminated. The secondary coat may be based on the same polymer as the original layer, or based on a different polymer.

A defect-free, dense, nonporous, discriminating layer may be formed by solution casting a sufficiently thick homogenous polymer film. It has also been demonstrated by Pfromm that ultra-thin, defect-free, dense, nonporous discriminating layers may be formed (Pfromm, P. H. "Gas transport properties and aging of thin and thick films made from amorphous glassy polymers" Dissertation submitted to The University of Texas at Austin (1994)).

The transport characteristics of gases through a defect-free, dense, nonporous, homogeneous polymer film, to those skilled in the art, is typically considered an "intrinsic" property of the polymer (Clausi, 1998). The intrinsic permeability of the polymer, for example, is independent of the thickness of the discriminating layer. If such a discriminating layer is used to separate a mixture of gases, and the layer is either a free standing film, or a composite on a support with negligible transport resistance compared to the discriminating layer, the ratio of the permeabilities of the specific mixture is also an intrinsic property of the polymer under those specified conditions. This ratio is called the intrinsic selectivity of the polymer to the specified gas components.

If the dense, nonporous, discriminating layer does not exhibit the "intrinsic" selectivity to a particular combination of gases, it is likely that this discriminating layer contains defects. This is because the defects permit non-discriminating transport of the components to be separated. This technique is commonly used, by those skilled in the art, to determine the presence of defects in discriminating layers, when the porous support offers negligible resistance to flow (Clausi, 1998; U.S. Pat. No. 4,902,422). This technique may be used to determine the presence or absence of defects regardless of the mechanism of formation of the discriminating layer. If it is verified that the discriminating layer is defect free, it will not permit the non-discriminating transport of gases or liquids, and in the case of liquid permeation, the permeating species will de-sorb from the membrane as a vapor.

The thin, dense, nonporous discriminating layer may be a separate layer. It may also be formed at nominally the same time, and integrally with, the support structure. It may consist of the same material as the support structure, or a different material in a composite form. The composite membrane has a dense layer that is attached to the support structure. The dense, nonporous, discriminating layer may be formed as a separate step at a later time. These composite films, fibers, or sheets may be porous or nonporous. The sheets, preferably, are flat, though this is not required to practice the invention. These fibers, films or sheets may be potted on one or more sides to separate the feed from the permeate space. The discriminating layer in such a membrane may be identical to or different from the support structure that may be composed of porous organic or inorganic polymer, ceramic or glass. The preferred embodiment would be a composite sheet or composite hollow fiber with a thin, dense, nonporous, discriminating layer of polymer on one or both faces of the support. In the case of a symmetric or asymmetric membrane, the liquid may contact the membrane on either side, although the preferred embodiment would be the one that minimizes the boundary layer on the feed side.

The dense nonporous layer, or skin, may also be an integral part of the membrane and formed at least nominally at the same time as the support structure. However, the invention is not limited to forming the dense nonporous layer at the same time as the support structure. The invention may also be practiced by forming the dense nonporous layer as a component (a.k.a. composite part) of the membrane. The dense nonporous layer may be formed at a different time than the support structure. In this case, the dense nonporous layer is subsequently attached to the support structure.

The support structure may be porous or nonporous. The dense nonporous skin, or the support structure, may be polymeric in nature. The dense nonporous skin, or support structure, may be an inorganic or organic polymer. The polymer may be a linear polymer, a branched polymer, a crosslinked polymer, a cyclolinear polymer, a ladder polymer, a cyclomatrix polymer, a copolymer, a terpolymer, a graft polymer, or a blend thereof.

The liquid of low volatility may wet the porous support structure. Alternatively, the porous support structure may be treated so that the liquid of low volatility does not wet the structure. However, this is not required to practice the invention. The invention may still be practiced when the porous support structure is not wetted with the liquid of low volatility. Furthermore, the invention may still be practiced when the porous support structure is treated such that the structure is not wetted with the liquid of low volatility. Preferably, the porous support structure is of such a nature that the low volatility liquid does not wet the structure.

In the situation wherein the membrane consists of a dense, nonporous layer, or skin, on only one side, the presence of defects in the dense, nonporous layer would likely result in passage of the oil, as discussed above. If the oil hydraulically permeates through the membrane it will likely evaporate at a slower rate than the water, or not at all, thus fouling the membrane and reducing dehydration rates. Consequently, the preferred embodiment would be one that has a defect free, dense, nonporous, discriminating layer, or skin, on one or both sides of the porous support structure. It is necessary to have a defect free, dense, nonporous, discriminating layer so that the oil cannot hydraulically permeate through defects in the discriminating layer. An advantage of having a defect free, dense, nonporous, discriminating layer on both sides of the porous structure is that the potential of hydraulic transport of the oil is diminished further.

In the case of hollow fibers, the feed may contact the membrane in the bore of the fiber, or on the outside of the fiber. The preferred embodiment would be the one where the liquid is fed on the outside to provide lower operating pressure drop.

The discriminating layer, or skin, may be composed of any family of polymers that is chemically compatible with the feed as long as the dense, nonporous layer does not permit the transport of the oil in substantial quantities. The discriminating layer, or skin, is chemically compatible with the oil if it does not chemically react with the oil, or if its physical properties such as size, strength, permeability, and selectivity are not adversely affected by contact with the oil. The dense, nonporous layer may be composed of polymers including, but not restricted to, polymers such as polyimides, polysulfones, polycarbonates, polyesters, polyamides, polyureas, poly(ether-amides), amorphous Teflon, polyorganosilanes, alkyl celluloses and polyolefins.

The liquid may be contacted with the membrane in a countercurrent, co-current, crossflow, or radial crossflow configuration. The flow may be such that either, none, or both streams (i.e., feed and permeate) are well mixed or unmixed. The feed stream is preferably well mixed.

The liquid stream containing the low volatility liquid (e.g. oil) and the water may be fed into the vessel to contact the defect-free, dense, nonporous layer of the membrane. However, the operation of the invention is not limited to feeding the liquid into the vessel to contact the dense nonporous layer. The invention may also be practiced by feeding the liquid into the vessel to contact the membrane on the side without the dense nonporous layer or skin.

The water partial pressure on the permeate side may be reduced by the application of vacuum, or by the use of a sweep gas with a low water vapor partial pressure, such as carbon dioxide, argon, hydrogen, helium, nitrogen, methane, or preferably air. The permeate flow, including the sweep, is preferably in the countercurrent, crossflow or radial crossflow mode. The pressure of the permeate may be equal to or less than the pressure of the feed.

Alternatively, the pressure of the permeate may be greater than the pressure of the feed. An example of when the pressure of the permeate is greater than the pressure of the feed would be when the permeate is removed by a sweep gas. The sweep gas may be comprised of dehydrated compressed air or nitrogen such that the pressure on the permeate side is greater than the pressure on the feed side of the vessel. Typically in this scenario, the activity of the high volatility liquid being removed from the feed is locally greater on the feed side than on the permeate side.

With membrane based oil dehydration, it is preferable to filter the incoming fluid. Filtration may be used to remove particulate matter or bulk water entrained in the stream. Any of the techniques known in the art to filter a fluid is suitable. This can prevent the destruction of the discriminating layer by particulate matter entrained in this stream.

In the preferred embodiment, the membrane consists of a hollow fiber with a dense, defect-free, nonporous discriminating layer on one or both sides of the porous support structure. In the preferred embodiment, the feed side boundary layer is minimized. In addition, in the preferred embodiment, the pressure drop across the feed side is minimized. The permeated water may be withdrawn, from the permeate side, by means of a vacuum or a sweep. This water will be in the vapor, or gas, phase. The sweep may be in the form of a gas or a liquid. In addition, the sweep may have a lower activity for water than that of the low volatility liquid.

This device may be applied in situations where vacuum purifiers and other conventional dehydrators are used. This process or device may be used to treat oil in a "kidney-loop" system, where the oil dehydrator is connected to a reservoir that is part of a piece of equipment. The oil is withdrawn from the process reservoir, processed through the dehydrator, and then returned to the reservoir.

The oil dehydrator may be operated continuously or intermittently while the main system is operating, or while it is at rest. This device may also be used "off-line", to treat the fluid in a reservoir. This reservoir is not connected to any piece of operating equipment and serves as a container for conditioning the fluid.

In addition to conventional applications, this device may be used "in-line". Since the feed and permeate spaces are separated by a dense, nonporous-barrier, it is possible to operate the device such that the feed and permeate are at different pressures. Consequently, the device may be operated in such a way that the oil is at the pressure of the system in which it is used. Consequently, this opens the possibility of using such a device and process "in-line," which is the preferred embodiment of this invention. The need for conventional off-line or kidney-loop systems is reduced and may be eliminated. Being able to use the present invention in-line and at system pressure allows it to be compact and lightweight and useful on virtually all hydraulic or lubrication equipment. It can, also, be used on stationary or mobile equipment since additional power; pumps and controls are not required.

Referring now to the drawings, wherein like numerals refer to the same elements, FIG. 1 is a flat sheet embodiment of a semi-permeable membrane 18. The membrane 18 includes the non-porous, defect-free, discriminating layer, or skin, 22 and the support structure 24. The discriminating layer or skin 22 may be present on either, or both, sides of the support structure 24.

Figure 13:
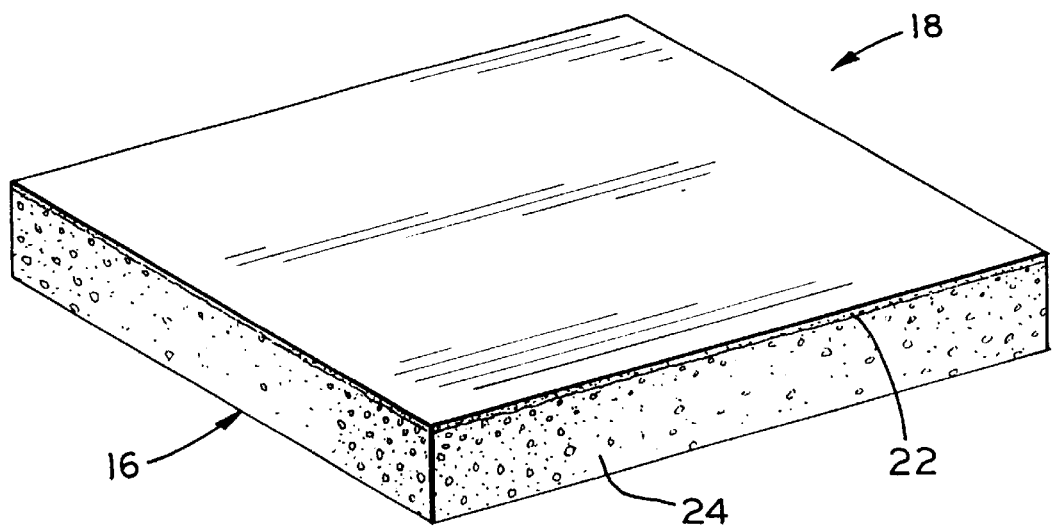
FIG. 13 is a perspective view of a modification of the construction shown in FIG. 1 wherein the membrane has an integrally formed skin.
Figure 14:
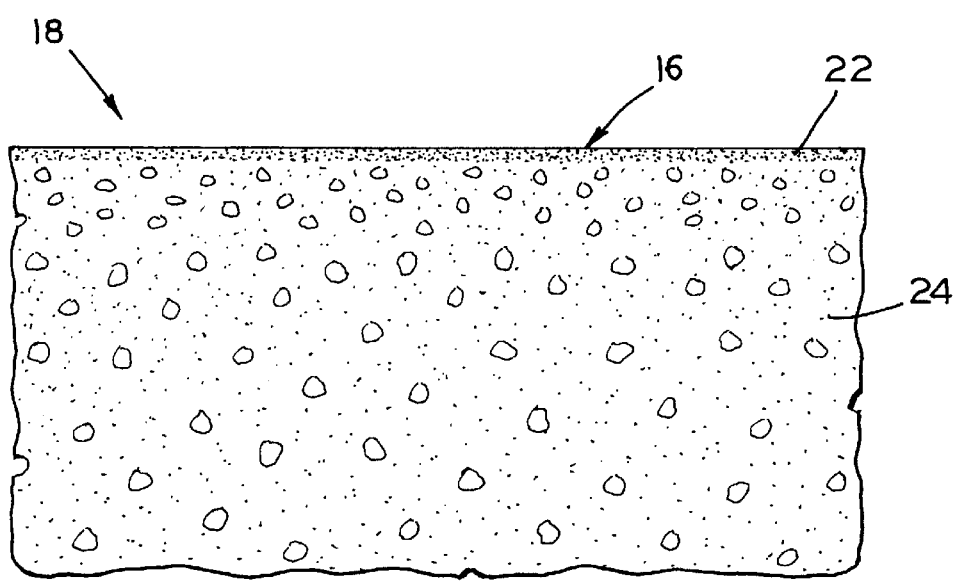
FIG. 14 is a fragmentary end elevational view of the construction shown in FIG. 13.

Referring to FIGS. 13–14, a modification of the semi-permeable membrane 18 is shown wherein the discriminating layer or skin 22 is formed integrally with the support structure 24 by methods known in the membrane art. As before, the discriminating layer or skin 22 may be present on either, or both, sides of the support structure 24.

Figure 2:
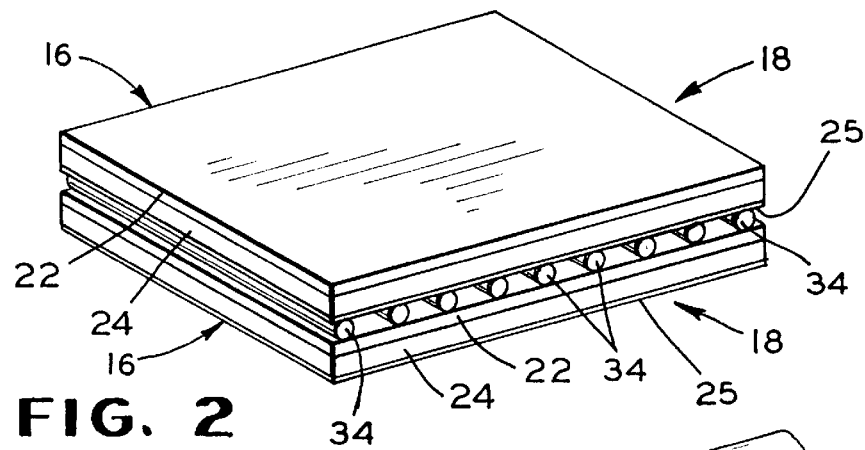
FIG. 2 is a perspective view of a modification of a membrane useful for the present invention.

In FIG. 2, two flat sheet semi-permeable membranes 18 are separated by a plurality of feed channel spacers 34. The spacers 34 may be made or formed of a variety of materials well known in the art, including potting compounds. Each membrane 18 has skin 22 and support structure 24. Permeate collection spacer 25, which is constructed to prevent the feed and permeate streams from mixing, is interposed between membrane 18 and spacers 34. Membranes 18 are separated by feed channel spacers 34.

Figure 3:
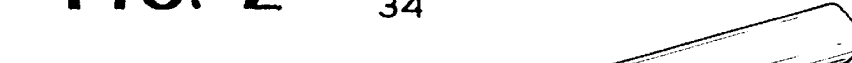
FIG. 3 is a perspective view of a further modification of a membrane useful for the present invention.

Depicted in FIG. 3 is a hollow fiber embodiment of the semi-permeable membrane 20. In this embodiment, hollow fiber membrane 20 includes the discriminating layer 22 and the support structure 24. The discriminating layer may be on the inside or outside of the fiber, or both sides of it.

Figure 15:
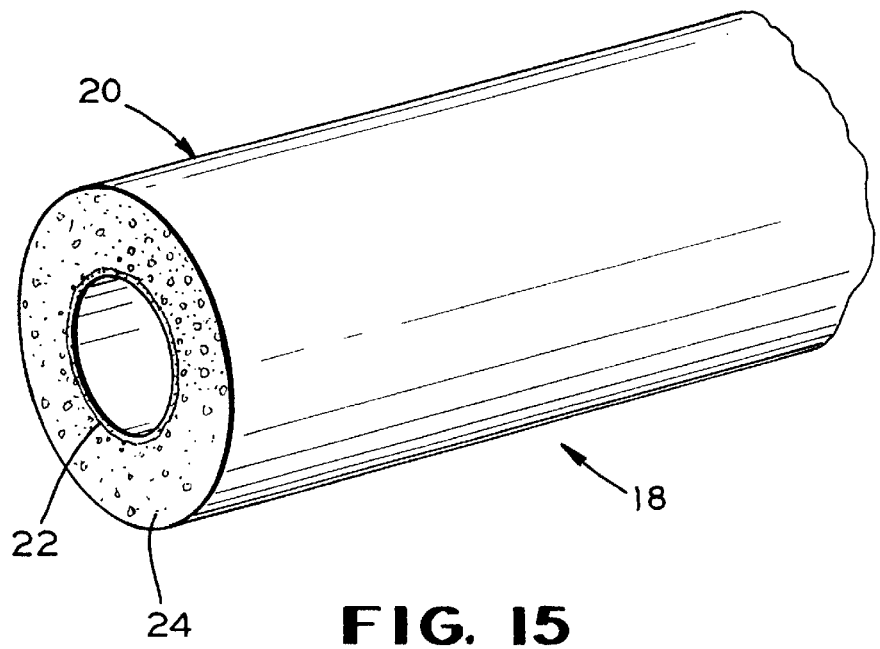
FIG. 15 is a perspective view of a modification of the construction shown in FIG. 3 wherein the membrane has an integrally formed skin.
Figure 16:
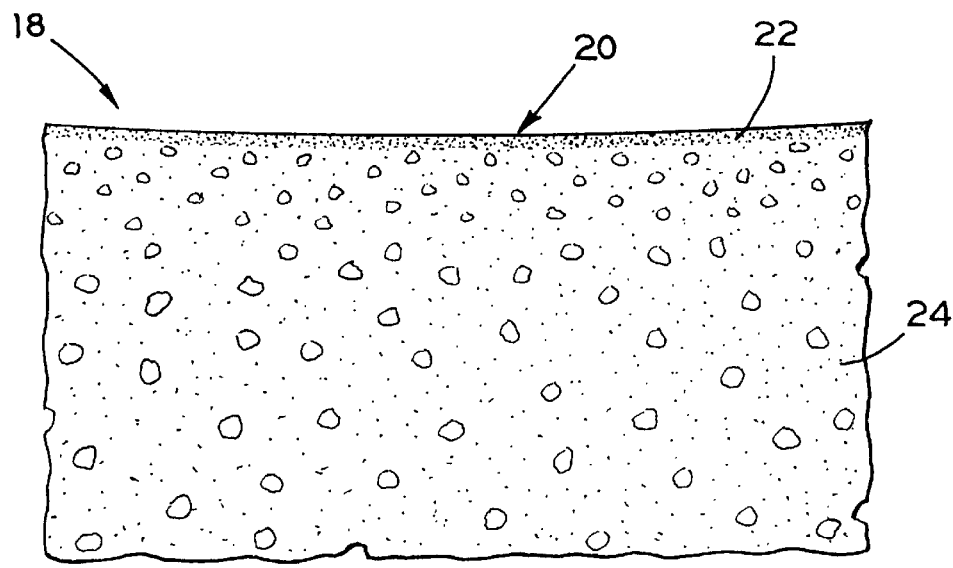
FIG. 16 is a fragmentary end elevational view of the construction shown in FIG. 13.

Referring to FIGS. 15–16, there is shown a modification of the hollow fiber membrane 20 wherein the discriminating layer or skin 22 is formed integrally with the support structure 24 by methods known in the membrane art. As before, the discriminating layer or skin 22 may be present on either, or both, sides of the support structure 24.

Figure 4A:
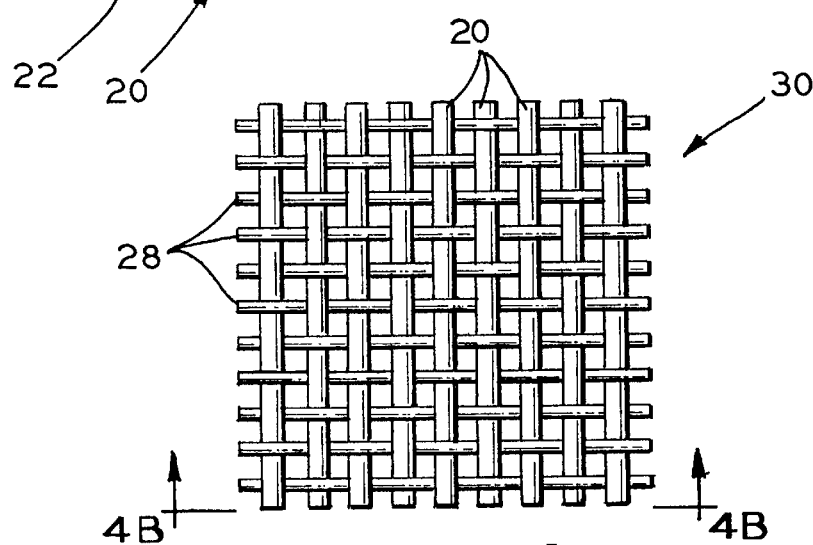
FIG. 4A is a plan view of a plurality of hollow fiber membranes, as shown in FIG. 3, woven into a mat.

Shown in FIG. 4A is a plurality of the hollow fiber semi-permeable membranes 20 woven into a mat 30. In terms of weaving or web technology, the hollow fiber membranes 20 would typically constitute the weft of the mat 30. A plurality of fillers 28 are used to weave the hollow fiber membranes 20 into a mat. The fillers 28 are used in the traditional sense of weaving a mat or web.

A cross sectional view along section line B—B of FIG. 4A is shown in FIG. 4B. The reference numerals used in FIG. 4B indicate the same elements as previously identified. Any weaving type process may be used to create hollow fiber mats, provided it does not damage the fibers.

In FIG. 4C mat 30 is shown spirally wound. Typically, a feed channel spacer 34, such as a potting compound 35, will have been applied proximate the ends of mat 30, and will fill the spaces between the hollow fibers 20, as will be discussed further below.

In FIG. 4D, two hollow fiber semi-permeable membranes 20 are helically wound to form a "rope" 32.

In FIG. 5, a flat sheet semi-permeable membrane 18 is spirally wound using known spiral-wound configurations and techniques which provide for a feed space and a permeate space in the spiral wound module. Before spirally winding the membrane 18, a feed channel spacer 34 was disposed on the discriminating layer 22. More than one flat sheet semi-permeable membrane 20 may be spirally wound at the same time. Typically, a plurality of flat sheet semi-permeable membranes 18 will be disposed horizontally to each other. The membranes 18 may or may not be separated by spacers 34. The assembly of the horizontally disposed plurality of flat sheet membranes 20 is then spirally wound on to core 60 (if used). Typically, the spiral would be wound tighter, and the feed channel spacer 34 would contact permeate collection spacer 25.

Figure 6:
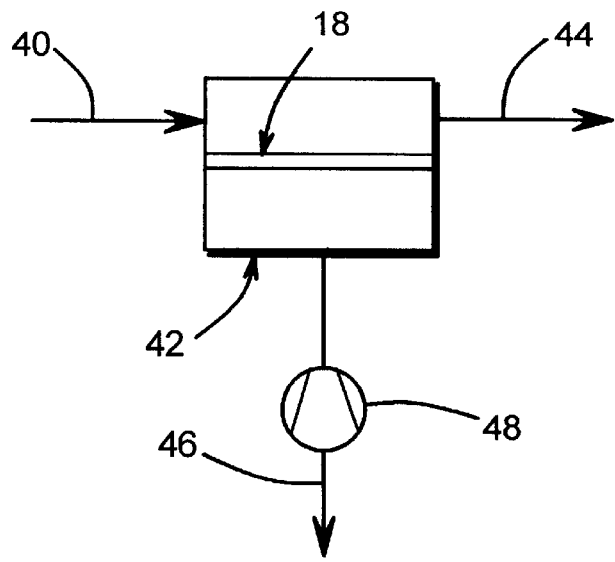
FIG. 6 is a schematic view of an exemplary membrane separation process embodying the present invention, wherein the water is removed by means of a vacuum pump.

In FIG. 6, the invention with a vacuum permeate mode is depicted. A water containing feed 40 is introduced to the feed side of a membrane separator vessel 42 so that the oil is efficiently contacted with the membrane 18. The feed 40 may optionally be heated before coming in contact with the membrane 20. The dehydrated low volatility liquid is removed from the vessel 42 in an effluent 44. The permeate 46 is withdrawn by means of a vacuum pump 48. Optionally, the feed 40 may flow parallel or perpendicular to the membrane 20 and the permeate 46 may also flow parallel or perpendicular to the membrane 20 or any combination thereof. Optionally, the vessel 42 may be heated.

Clearly, the vessel 42 should be sized appropriately to the desired flow rate of the feed 40, the desired operating pressure drop, and the amount of water to be removed. The permeate 46 is illustrated in the crossflow configuration, but, the feed 40 and the permeate 46 may also flow in relation to each other in countercurrent flow, co-current flow, or radial cross flow.

Figure 7:
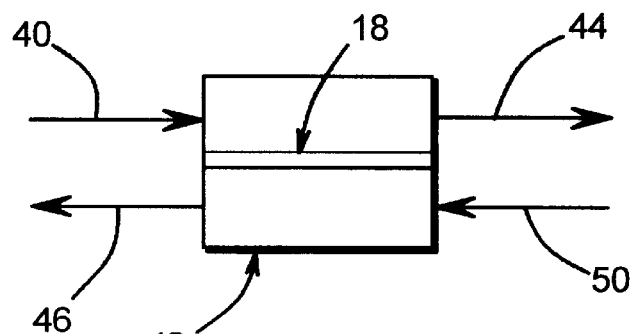
FIG. 7 is a schematic view of a modification of separation process shown in FIG. 6, wherein the water is removed by means of a sweep gas stream.
Figure 8:
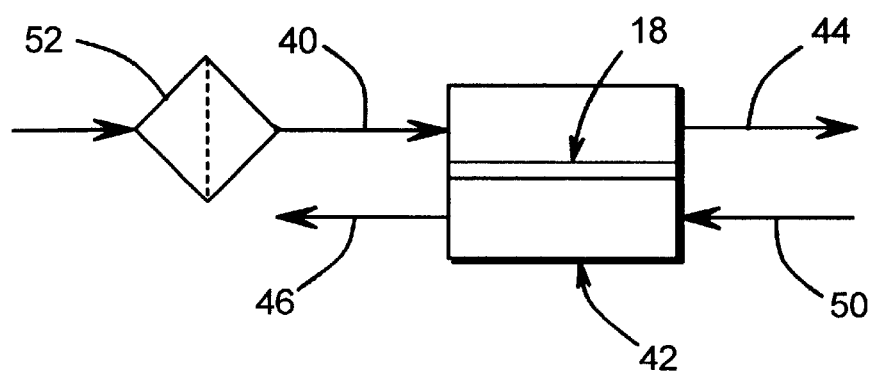
FIG. 8 is a schematic of a further modification of the separation process shown in FIG. 6, wherein the membrane is protected from contaminants in the feed stream by means of an upstream filter.
Figure 9:
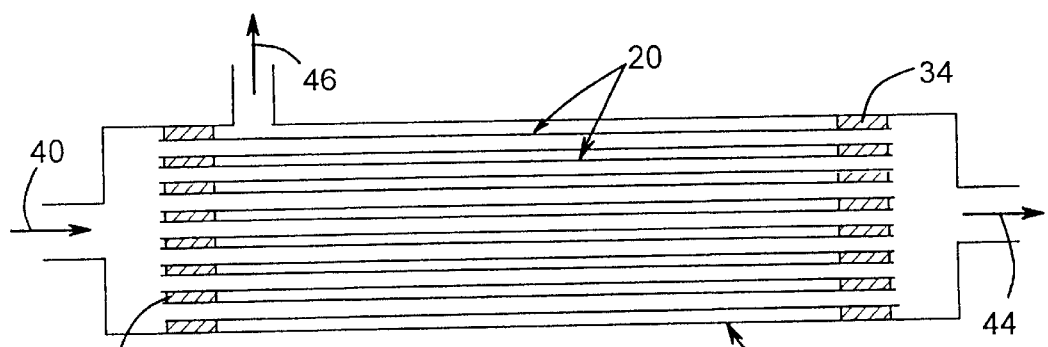
FIG. 9 is an elevational view of a hollow fiber membrane device embodying the construction of the present invention, wherein the feed flows in the bore of the fibers.
Figure 10:
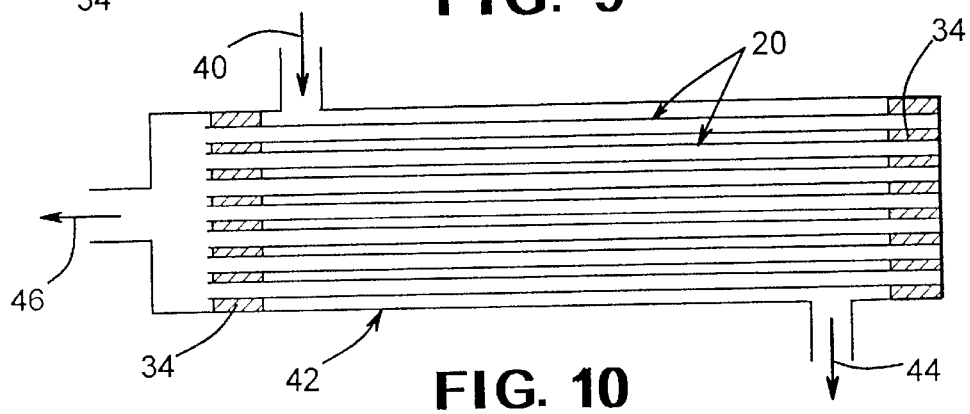
FIG. 10 is an elevational view of a hollow fiber membrane device embodying the construction of the present invention, wherein the feed flows on the outside of the fibers.

The sweep gas mode is demonstrated in FIGS. 7 and 8 where there is an inlet on the permeate side of membrane 20 for a sweep fluid 50. The feed stream can be filtered as shown in FIG. 8 by means of a filter 52.

Figure 11:
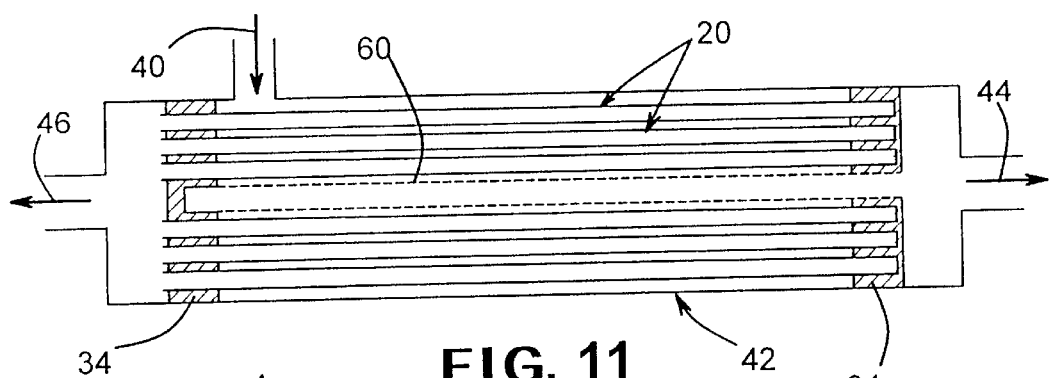
FIG. 11 is an elevational view of a hollow fiber membrane device embodying the construction of the present invention, wherein the feed flows on the outside of the fibers and the water is removed countercurrent to the exiting oil. The oil is extracted by means of a perforated core.
Figure 12:
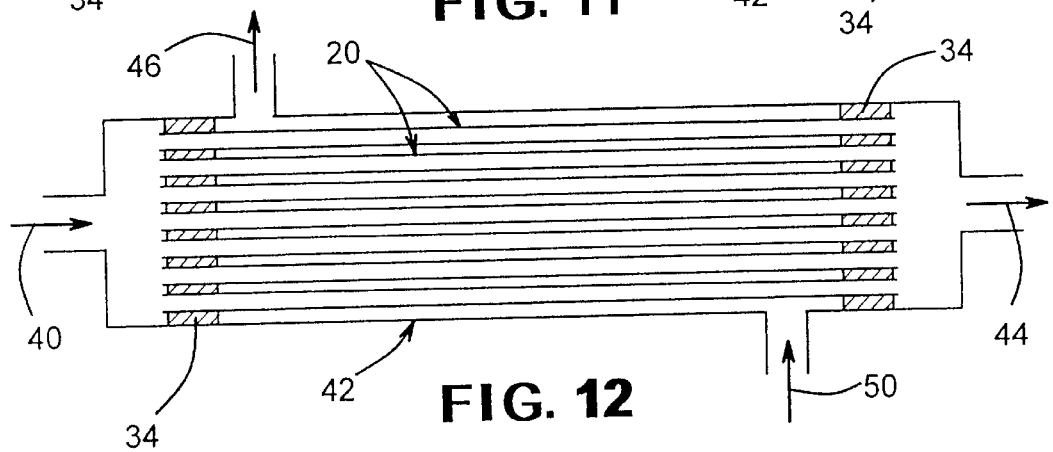
FIG. 12 is an elevational view of a hollow fiber membrane device embodying the construction of the present invention, wherein the water is removed by means of a sweep gas.

In FIGS. 9,10,11, and 12 the fluid on the bore side of the hollow fiber 20 is separated from the fluid on the shell side by means of a potting compound 34. In FIG. 11, the oil exits by means of a perforated core 60. The perforated core 60 is a conventional perforated core with a housing 62 having a perforated section 64 and an outlet 68.

The perforated section includes a plurality of perforations 66. The outlet 68 is in communication with the effluent 44 of the vessel 42. The perforations may be any suitable size or configuration. The liquid of low volatility flows over the housing 62 and the perforated section 64. The low volatility liquid enters the housing 62 through the perforations 66. The low volatility liquid exits the perforated core 60 through the outlet 68.

In addition to lubricating oils, this device and process may also be used for dehydrating other fluids, such as vegetable or food grade oils, silicones, or other fluids of low volatility.

The terms and expressions that have been used in the foregoing specification are used as terms of description and not of limitations and there is no intention in the use of such terms and expressions of excluding equivalents of the features shown and described or portions thereof. It is recognized that the scope of the invention is defined and limited only by the claims that follow.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A process for the dehydration of oils, comprising the following steps:
    a) contacting one side of a defect-free, dense, nonporous membrane with a liquid stream containing free, emulsified or dissolved water and oil, wherein the membrane divides the separation chamber into a feed side, into which the liquid stream is fed, and a permeate side, from which the water is withdrawn; wherein;
        1) the defect-free, dense, nonporous membrane is a composite part of a hollow fiber wherein a defect-free, dense, nonporous discriminating layer is supported on a porous support; and
        2) the discriminating layer and porous support are polymeric in nature;
    b) maintaining a partial pressure differential for water such that the water selectively permeates by "solution diffusion" through the discriminating polymer layer from the feed side to the permeate side as a vapor;
    c) removing the water vapor that has permeated from the permeate side with a sweep gas stream or vacuum;
    d) preventing permeation of oil to the permeate side in the liquid phase; and
    e) removing the dehydrated oil from the feed side of the membrane.

2. A process for the dehydration of low volatility liquids, comprising the following steps:
    a) contacting one side of a defect-free, nonporous, semi-permeable membrane with a liquid stream containing at least water and liquid of low volatility, wherein the membrane divides a separation chamber into a feed-side, into which the liquid stream is fed, and a permeate side, from which the water is withdrawn, wherein:

1) the defect-free, dense, nonporous membrane is a composite part of a hollow fiber wherein a defect-free, dense, nonporous discriminating layer is supported on a porous support; and
2) the discriminating layer and porous support are polymeric in nature;

b) maintaining a partial pressure differential for water such that the water permeates through the membrane from the feed side to the permeate side and the liquid of low volatility cannot permeate to the permeate side by hydraulic transport; said low volatility liquid in oil;

c) removing the water that has permeated from the permeate side; and d) removing the dehydrated liquid from the feed side of the membrane.

3. The process defined in claim 2, wherein the liquid of low volatility is defined as a liquid with a normal boiling point greater than that of water.

4. The process defined in claim 2, wherein water is present in the liquid of low volatility in the dissolved, dispersed or emulsified form, or as a separate phase.

5. The process defined in claim 2, wherein the defect-free, nonporous, semi-permeable membrane consists of a dense, nonporous, self-supported layer.

6. The process defined in claim 2, wherein the liquid stream is well mixed.

7. The process defined in claim 2, wherein the liquid stream is not well mixed.

8. The process defined in claim 2, wherein the process is in line in another system wherein at least a part of the entire flow of the liquid of low volatility is continually fed through the said process.

9. The process defined in claim 2, wherein the process operates as a "kidney loop" in another system wherein a fraction of the total flow of the liquid of low volatility is continually fed through the said process.

10. The process defined in claim 2, wherein the process operates offline in another system, and wherein the liquid of low volatility is fed through the said process from a storage device.

11. The process defined in claim 2, wherein the feed flows parallel to the surface of the semi-permeable membrane.

12. The process defined in claim 11, wherein the flow on the permeate side is parallel to the surface of the semi-permeable membrane.

13. The process defined in claim 11, wherein the flow on the permeate side is perpendicular to the surface of the semi-permeable membrane.

14. The process defined in claim 2, wherein the feed flows perpendicular to surface of the semi-permeable membrane.

15. The process defined in claim 14, wherein the flow on the permeate side is parallel to the surface of the semi-permeable membrane.

16. The process defined in claim 14, wherein the flow on the permeate side is perpendicular to the surface of the semi-permeable membrane.

17. The process defined in claim 2, wherein the flows on the feed side and on the permeate side are countercurrent.

18. The process defined in claim 2, wherein the flows on the feed side and on the permeate side are co-current.

19. The process defined in claim 2, wherein the flows on the feed side and on the permeate side are crossflow.

20. The process defined in claim 2, wherein the flows on the feed side and on the permeate side are radial crossflow.

21. The process defined in claim 2, wherein the permeate side is at a pressure greater than that of the feed side.

22. The process defined in claim 2, wherein the permeate side is at the same pressure or lower than the feed side.

23. The process defined in claim 2, wherein there is a sweep of gas or liquid through the permeate side.

24. The process defined in claim 2, wherein there is a sweep of gas through the permeate side, and said sweep gas is selected from the group consisting of argon, methane, nitrogen, air, carbon dioxide, helium, or hydrogen or any mixture thereof.

25. The process defined in claim 2, wherein said there is a sweep of gas through the permeate side, and said sweep gas has a lower activity for water than that of the low volatility liquid.

26. The process defined in claim 2, wherein the porous support is ceramic.

27. The process defined in claim 2, wherein the porous support is glass.

28. The process defined in claim 2, wherein the porous support is an inorganic polymer.

29. The process defined in claim 2, where the liquid of low volatility is filtered before it contacts the semi-permeable membrane.

30. The process defined in claim 2, where the wherein the semi-permeable membrane consists of a plurality of hollow fibers and the hollow fibers are woven in a mat.

31. The process defined in claim 2, wherein the liquid stream is heated before contacting the membrane.

32. The process defined in claim 2, wherein said nonporous, semi-permeable membrane has an integrally formed skin on at least one side of the support structure.

33. A process for the dehydration of oil, comprising the following steps:

a) contacting one side of a defect-free, semi-permeable nonporous membrane with a liquid stream containing at least water and oil b) where the water is free, emulsified or dissolved in the oil;

c) wherein the membrane divides a separation chamber into a feed-side, into which the liquid stream is fed, and a permeate side, from which the water is withdrawn;

d) maintaining a partial pressure differential for water such that the water permeates through the membrane from the feed side to the permeate side and the oil cannot permeate to the permeate side by hydraulic transport;

e) removing the water that has permeated from the permeate side; and f) removing the dehydrated oil from the feed side of the membrane.

34. The process defined in claim 33, wherein the defect-free, nonporous, semi-permeable membrane consists of one or more dense, nonporous layers on a porous or nonporous hollow fiber.

35. The process defined in claim 33, wherein the defect-free, nonporous, semi-permeable membrane consists of one or more, dense nonporous layers on a porous or nonporous flat sheet.

36. The process defined in claim 33, wherein the defect-free, nonporous, semi-permeable membrane includes a dense, nonporous layer as an integral part of a hollow fiber, the dense, nonporous layer being formed at the same time as a support structure in the hollow fiber.

37. The process defined in claim 33, wherein the defect-free, nonporous, semi-permeable membrane includes a dense, nonporous layer as an integral part of a flat sheet, the dense, nonporous layer being formed nominally at the same time as a support structure in the flat sheet.

38. The process defined in claim 33, wherein the defect-free, nonporous, semi-permeable membrane includes a dense, nonporous layer as a composite part of a hollow fiber, the dense, nonporous layer being formed at a different time than a support structure in the hollow fiber.

39. The process defined in claim 33, wherein the defect-free, nonporous, semi-permeable membrane includes a dense, nonporous layer as a composite part of a flat sheet, the dense, nonporous layer being formed at a different time than a support structure in the flat sheet.

40. The process defined in claim 33, wherein the defect-free, nonporous, semi-permeable membrane includes a support structure in a hollow fiber, the hollow fiber having a dense, nonporous layer on one of the bore or outside faces.

41. The process defined in claim 33, wherein the defect-free, nonporous, semi-permeable membrane includes a support structure in a flat sheet, the flat sheet having a dense, nonporous layer on one of its sides.

42. The process defined in claim 33, wherein the defect-free, nonporous, semi-permeable membrane includes a support structure in a hollow fiber, the hollow fiber having a dense, nonporous layer on both its bore and outside faces.

43. The process defined in claim 33, wherein the defect-free, nonporous, semi-permeable membrane includes a support structure in a flat sheet, the flat sheet having a dense, nonporous layer on both of its sides.

44. The process defined in claim 33, wherein the defect-free, nonporous, semi-permeable membrane consists of a dense, nonporous layer on a porous or nonporous hollow fiber, and the liquid of low volatility is fed on the side with the dense, nonporous layer.

45. The process defined in claim 33, wherein the defect-free, nonporous, semi-permeable membrane consists of a dense nonporous layer on a porous or nonporous flat sheet, and the oil is fed on the side without the dense, nonporous layer.

46. The process defined in claim 33, wherein the defect-free, nonporous, semi-permeable membrane consists of one or more dense, nonporous layers on a porous or nonporous hollow fiber, wherein the oil is fed on the outside of the fibers.

47. The process defined in claim 33, wherein the defect-free, nonporous, semi-permeable membrane consists of one or more dense, nonporous layers on a porous or nonporous hollow fiber, wherein the oil is fed on the inside of the fibers.

48. The process defined in claim 33, wherein the defect-free, nonporous, semi-permeable membrane consists of one or more dense nonporous layers on a porous or nonporous hollow fiber, wherein the fibers are helically wound.

49. The process defined in claim 33, wherein the defect-free, nonporous, semi-permeable membrane consists of one or more dense nonporous layers on a porous or nonporous flat sheet, wherein the flat sheets are spirally wound.

50. The process defined in claim 33, wherein the defect-free, nonporous, semi-permeable membrane consists of one or more dense nonporous layers on a porous or nonporous flat sheet, wherein spacers separate the flat sheets.

51. The process defined in claim 33, wherein the defect-free, nonporous, semi-permeable membrane consists of one or more dense, nonporous layers on a porous or nonporous hollow fiber, and the feed flows parallel to the hollow fiber.

52. The process defined in claim 33, wherein the defect-free, nonporous, semi-permeable membrane consists of at least one dense, nonporous layer on a porous or nonporous hollow fiber, and the flow on the permeate side is parallel to the hollow fiber.

53. The process defined in claim 33, wherein the defect-free, nonporous, semi-permeable membrane consists of at least one dense, nonporous layer on a porous or nonporous hollow fiber, and the flow on the permeate side is perpendicular to the hollow fiber.

54. The process defined in claim 33, wherein the defect-free, nonporous, semi-permeable membrane consists of at least one dense nonporous layer on a porous or nonporous hollow fiber, and the feed flows perpendicular to the hollow fiber.

55. The process defined in claim 33, wherein the defect-free, nonporous, semi-permeable membrane consists of at least one dense nonporous layer on a porous or nonporous flat sheet, and the feed flows parallel to the flat sheet.

56. The process defined in claim 33, wherein the defect-free, nonporous, semi-permeable membrane consists of at least one dense nonporous layer on a porous or nonporous flat sheet and the flow on the permeate side is parallel to the flat sheet.

57. The process defined in claim 33, wherein the defect-free, nonporous, semi-permeable membrane consists of at least one dense nonporous layer on a porous or nonporous flat sheet, and the flow on the permeate side is perpendicular to the flat sheet.

58. The process defined in claim 33, herein the defect-free, nonporous, semi-permeable membrane consists of at least one dense nonporous layer on a porous or nonporous flat sheet and the feed flows perpendicular to the flat sheet.

59. The process defined in claim 33, wherein the defect-free, nonporous, semi-permeable membrane includes a porous support structure, and the porous support structure is wetted by the liquid of low volatility.

60. The process defined in claim 33, wherein the defect-free, nonporous, semi-permeable membrane includes a porous support structure, and the porous support structure is treated so that it is wetted by the liquid of low volatility.

61. The process defined in claim 33, wherein the defect-free, nonporous, semi-permeable membrane includes a porous support structure, and the porous support structure is not wetted by the liquid of low volatility.

62. The process defined in claim 33, wherein the defect-free, nonporous, semi-permeable membrane includes a porous support structure, and the porous support structure is treated so that it is not wetted by the liquid of low volatility.

63. The process defined in claim 33, wherein the defect-free, nonporous, semi-permeable membrane includes a dense nonporous layer, and said non-porous layer is polymeric in nature.

64. The process defined in claim 33, wherein the defect-free, nonporous, semi-permeable membrane includes a dense porous support, and the dense porous support is polymeric in nature.

65. The process defined in claim 33, wherein the semi-permeable membrane of uniform construction consists of a dense, nonporous, self supported layer having an integrally formed skin.

* * * * *